United States Patent [19]

MacFadyen et al.

[11] Patent Number: 4,899,217
[45] Date of Patent: Feb. 6, 1990

[54] COMMUNICATION AND ENERGY CONTROL SYSTEM FOR HOUSES

[75] Inventors: David J. MacFadyen, Derwood, Md.; Robert G. Edwards, Oak Ridge, Tenn.; Kenneth P. Wacks, Stoneham, Mass.; Daniel J. Foley, Chelmsford, Mass.

[73] Assignee: Smart House Limited Partnership, Upper Marlboro, Md.

[21] Appl. No.: 126,794

[22] Filed: Dec. 1, 1987

[51] Int. Cl.⁴ .............................. H04M 11/00
[52] U.S. Cl. ........................ 358/86; 379/102; 379/104; 379/105; 455/3
[58] Field of Search .............. 379/102, 104, 105; 455/3, 4; 358/86

[56] References Cited

U.S. PATENT DOCUMENTS

| | | | |
|---|---|---|---|
| 4,439,784 | 3/1984 | Furukawa et al. | 358/86 |
| 4,446,458 | 5/1984 | Cook | 340/310 CP |
| 4,467,314 | 8/1984 | Weikel et al. | 340/310 A |
| 4,538,031 | 8/1985 | Benning et al. | 379/105 |
| 4,635,040 | 1/1987 | Masot | 340/533 |
| 4,665,544 | 5/1987 | Honda et al. | 379/104 |
| 4,703,306 | 10/1987 | Barritt | 340/310 CP |

FOREIGN PATENT DOCUMENTS

| | | | |
|---|---|---|---|
| 59-94927 | 5/1984 | Japan | 358/86 |
| 60-134540 | 7/1985 | Japan | 358/86 |
| 2166328 | 4/1986 | United Kingdom | 358/86 |

OTHER PUBLICATIONS

Rabbit the VCR "Multiplying" System, Owner's Manual.
Kamen, Ira, "Television Master Antennas", Radio and Television News, Apr., 1949, p. 3–43, 136–139.
Lerner, Daniel, "Multi-TV Receiver Operation from Single Antenna", Radio and Television News, May 1950, p. 79–80.
T. S. Perry, "Portia's Perfect Pad: Superhigh-Tech", May 1985, IEEE Spectrum, pp. 56–63.

Primary Examiner—Jin F. Ng
Assistant Examiner—Wing F. Chan
Attorney, Agent, or Firm—Cushman, Darby & Cushman

[57] ABSTRACT

An automated system for providing different services within a house includes an appliance coordination data network for communicating relatively low speed appliance digital data within a house, a high capacity data network for transferring high speed digital data within the house, an energy distribution system for distributing energy throughout the house, an analog services distribution system for distributing conventional analog signals throughout the house and a video services distribution network for distributing video services throughout the house. The appliance coordination network interfaces with the energy distribution system to control the flow of energy to appliances throughout the house responsive to a digital request or interrogation signal that is emitted from the appliance itself.

17 Claims, 5 Drawing Sheets

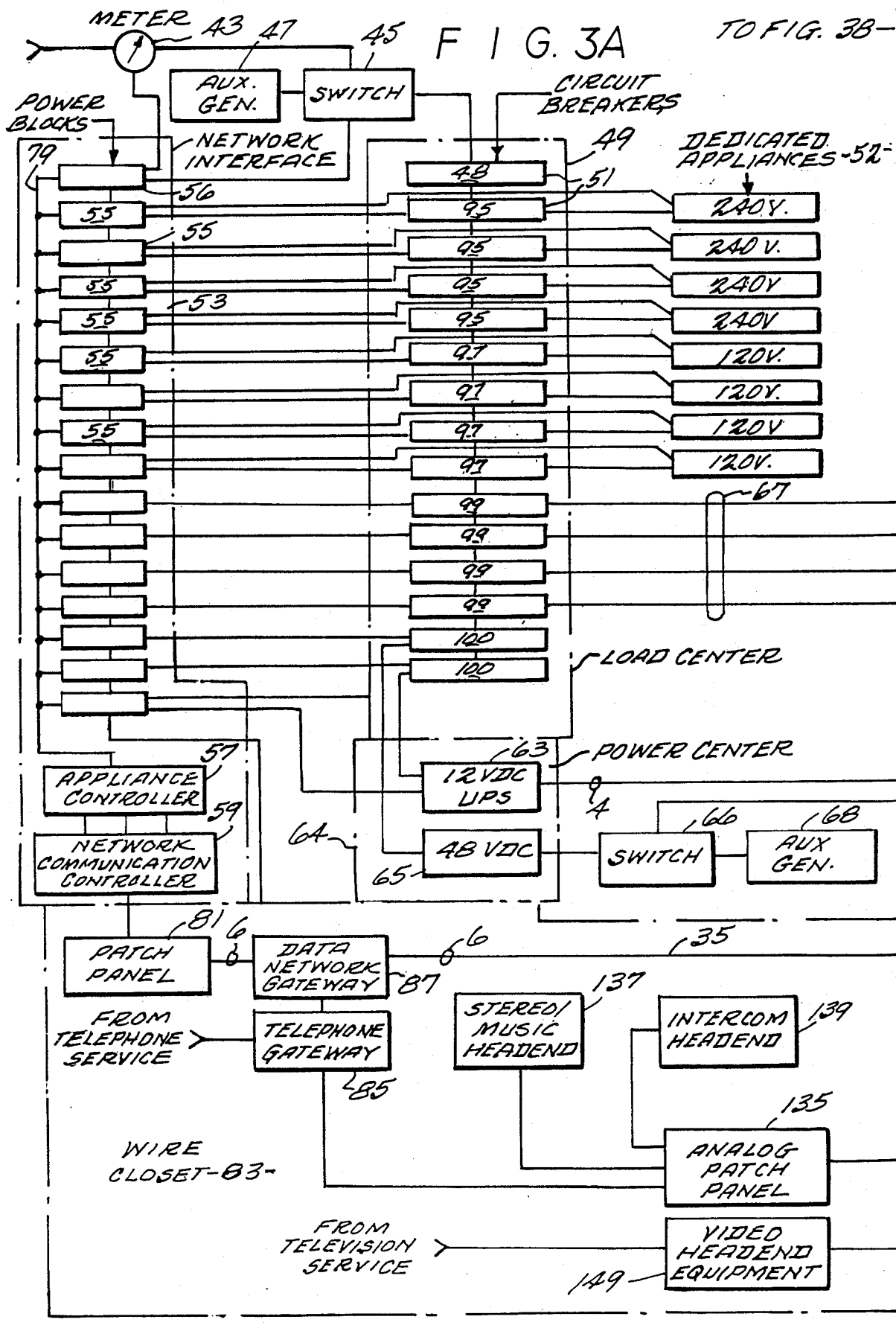

COMMUNICATION AND ENERGY CONTROL SYSTEM FOR HOUSES

BACKGROUND OF THE INVENTION

1. Field of the Invention

The present invention relates to a system for controlling the flow of energy and communications in a house.

2. Description of the Prior Art

In the past, energy has been provided to houses in the form of electricity, or has been generated in the house using gas or other fossil fuels as the source of energy. Houses have been wired for electricity and provided with plumbing for gas as if these wee the only raw materials upon which the various lighting fixtures and appliances in the house operated. In fact, many appliances are not isolated units, but interconnected systems. Common examples are central heating and air conditioning, and sophisticated security systems. These appliances require more than energy; they need communication networks and distributed sensors. The operation of such appliances has required custom wiring and custom control systems. There has been no common wiring integral to the house and no common communications protocol to provide the desired services to members of the household. Accordingly, it is an object of the present invention to provide an improved communication system within a house.

Access to receptacles for electricity has been relatively easy and open, resulting in problems with safety for the individuals in the house. Accordingly, it is an object of the present invention to provide an improved utility distribution and control system in a house in order to deliver energy to household fixtures and appliances more safely and in more efficient forms.

SUMMARY OF THE INVENTION

The present invention provides an automated system for controlling the distribution of different services within a house. The invention includes an appliance coordination data network for communicating relatively low speed digital data within the house, a high capacity data network for transferring high speed digital data within the house, an energy distribution system for supplying energy to appliances throughout the house responsive to data received from the appliance coordination data network, an analog services distributing network for distributing conventional analog signals throughout the house and a video services distributing network for distributing conventional video signals throughout the house.

Other objects, features, and advantages of the present invention will become more fully apparent upon consideration of the following detailed description of the preferred embodiment, the appended claims and the accompanying drawings.

BRIEF DESCRIPTION OF THE DRAWINGS

FIGS. 3A and 3B are wiring diagrams for a system constructed according/to the preferred embodiment of the present invention;

DETAILED DESCRIPTION OF THE PREFERRED EMBODIMENT

The present invention is intended to improve the safety and efficiency of energy distribution within a house, enhance the communications system and integrate the energy and communication distribution and control facilities within the house.

In accordance with the preferred embodiment of the invention, five major systems are provided within a house in order to meet these requirements. These systems include an appliance coordination data network and a high capacity data network, both of which are digital in nature and may share a common digital communication model, which will be discussed below. The other major systems which are provided by the present invention include an energy distribution system, an analog services distribution system and a video services distribution system, all of which will be described hereinbelow. Although each of the above-mentioned systems will be disclosed independently from the others, it should be understood that there is a great deal of functional interaction among the systems, which allows for the sharing of components therebetween in the preferred embodiment.

Figure 1:
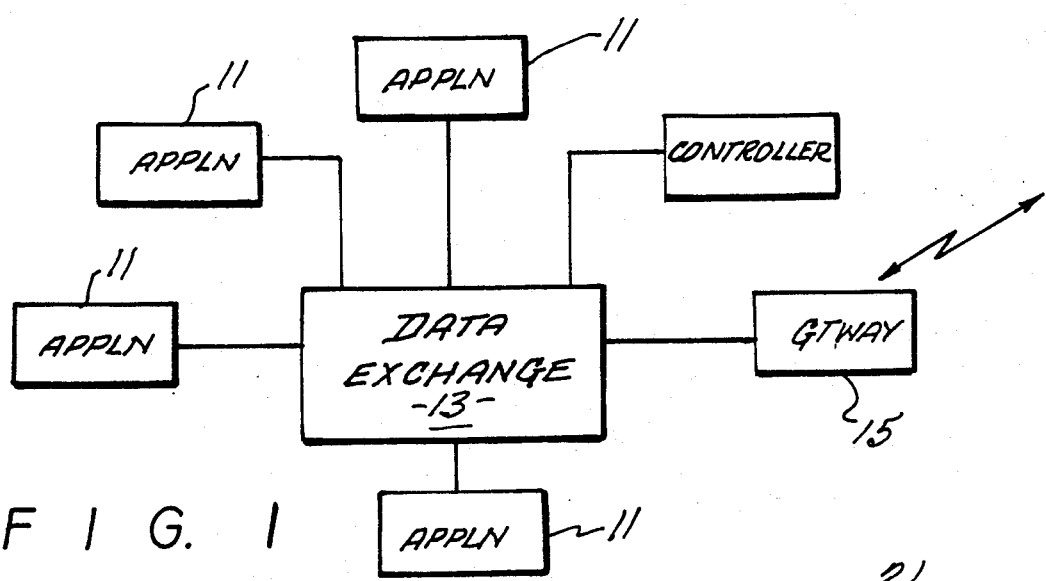
FIG. 1 is a schematic diagram of the data communication exchange system of the preferred embodiment of the present invention.

A fundamental requirement of the present invention is that any appliance or controller within the house should be able to exchange data with respect to one another using facilities incorporated in the house. This broad concept is generally illustrated in FIG. 1, wherein there is illustrated a variety of appliances 11 connected to one another through a data exchange 13. The data exchange 13 is a system for allowing data to pass from one appliance to another. As used herein, the term appliance generically includes, but is not limited to, large appliances such as washing machines, dryers and refrigerators; electronic devices such as televisions and radios; and portable appliances such as food processors, hair dryers and the like. The term appliance may also refer to telephones, fixtures such as lights and fans, and switches and sensors for detecting climate conditions such as temperature, humidity and smoke. The term appliance also my include application-specific controllers for controlling heating, ventilating, air conditioning or similar subsystems in a house. The gateway terminal 15, which will be described in greater detail below, is an interface for communicating outside the house, such as via a public telephone network or power lines.

As shown in FIG. 1, data exchange 13 is in the form of a local area network wherein messages from a sender such as an appliance 11 are selectively conveyed to a communications link which interconnects all of the appliances and is read by an interface serving each appliance. Each outlet through which an appliance 11 is connected to the communications link is assigned a unique address. The sender includes this address near the beginning of the data message, and the local area network interface for the outlet examines this address for a match. Such an address match will be found only by the interface of the destination outlet. The local area network interface is then enabled to deliver the data destined for the appliance.

Communications within a house constructed according to the present invention are carried by two such local area networks. The aforementioned appliance coordination data network interconnects appliances with each other, with switches and sensors, and with controllers. The other local area network is the high capacity data network, which is designed for linking controllers which communicate at speeds of one million bits per second or higher. The local area networks that are provided in the present invention permit data communication between any of the appliances and controllers that are connected and capable of using the networks. These systems along with the other major systems provided by the present invention will now be described in greater detail below.

1. The Data Network for Coordinating Appliances

The appliance coordination data network is designed to communicate low speed digital data. It thus provides communication linkages for the aforementioned appliances which includes switches, sensors and controllers. Switches send signals only when activated. Sensors report status data either when interrogated or periodically at a low repeat rate. Appliances using the appliance coordination data network can command each other to operate at appropriate times and conditions. For example, a sensor may detect the presence of a person entering a room and generate a signal which is conveyed through the appliance coordination data network to a light fixture to cause it to be energized. The appliance coordination data network also provides a link to a regional controller for overall coordination and monitoring of the appliance operation. The communication format consists of digital data bits which are transferred in the form of packets of data. As will be explained below, detection techniques such as parity verification and check sums will be included in the data packets. Accordingly, the receiving appliance can then acknowledge to the sending appliance the receipt of a packet without error. If an acknowledgment is not received within a specified period of time, the data packet is retransmitted, and the process is repeated. In one embodiment of the present invention, the local area network consists of a common communications bus with a plurality of appliances and, where appropriate, a regional controller connected thereto.

Figure 2:
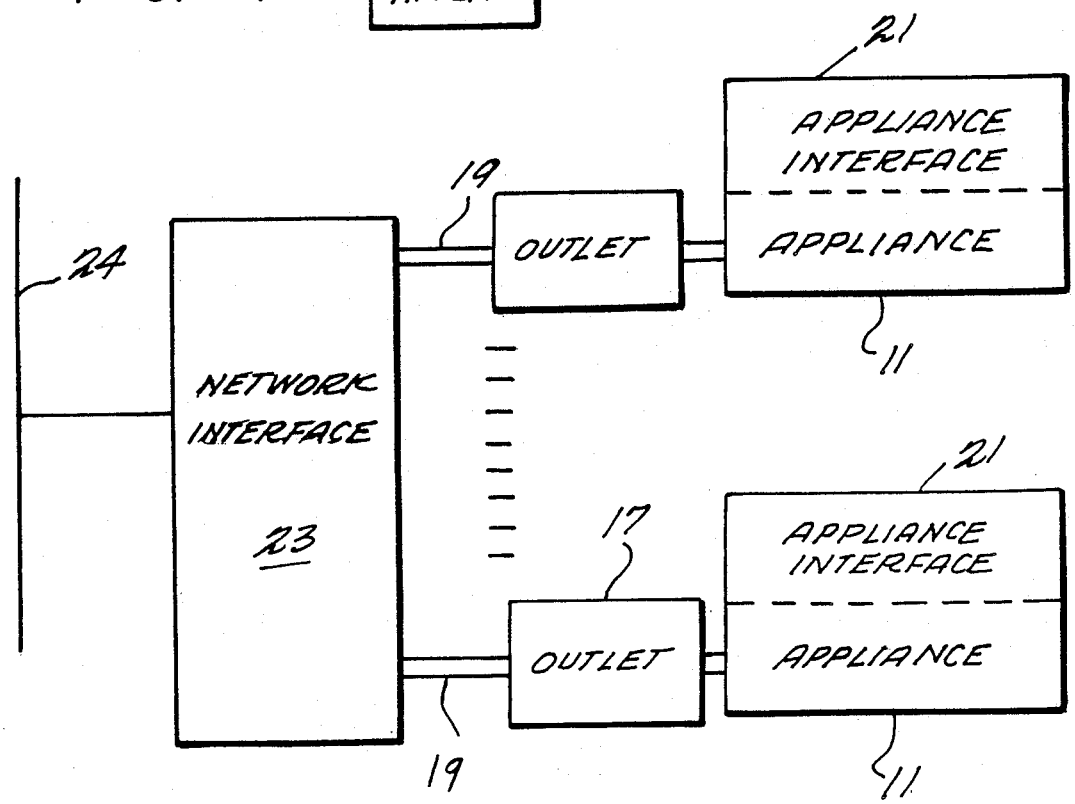
FIG. 2 is a schematic diagram representing the network interface for the data and energy distribution systems.

A network interface, which forms part of the data network, is provided in each room of the house for routing and delivering energy and communication services to all appliances and devices located in the room. The network interface 23 contains outlet control type power blocks 73, fixtures type power blocks 120, and switches/sensor type power blocks 118; an appliance controller; a network communications controller 61; an analog services controller 93; a high capacity network controller 91, and a video services controller 153 as shown in FIG. 3. In the preferred embodiment, up to twelve simplex outlets, two fixtures, and two sensors can be accommodated by each network interface 23. This represents a total of sixteen power block devices installed in a network interface unit. FIG. 2 illustrates the arrangement of the network interface 23 with respect to a local area network bus 24, a convenience outlet 17, and an appliance 11. The network interface unit 23 should be located in an accessible area of each room or group of rooms of the house.

In operation, in the preferred embodiment, any network interface can access the data bus and must be responsible for ensuring that the bus is not currently in use. Thus, the network interface contains means for organizing the use of the bus so that only one data packet occupies the bus at any one time. A number of standard protocols are commercially available for communicating on such a local area network. Alternatively, a token ring type network may be implemented for the communications bus, as is known in the art.

The interface between the local area network of the appliance coordination data network and one of the appliances will now be described. As illustrated in FIG. 2, a system constructed according to the present invention contains a convenience outlet 17 which uses a pair of wires 19 to connect the appliance interface 21 contained within the appliance 11 to the network interface 23 for communicating coordination data via the local area network bus 24. The single pair of wires 19 will be used either for transmission or for reception in a half duplex arrangement. The network interface 23 receives data from appliance 11. The data is grouped into packets, which include the addresses of the source and destination appliances, such as sensors or controllers. The data packets are then transmitted to another appliance connected to the same network interface or transmitted to the local area network bus 24 when the bus is free of other data traffic. In a reciprocal fashion, the network interface 23 examines all of the data packets on the bus 24 to determine if any have the address of an outlet connected to it. If so, the data field portion of the packet is sent to the appliance connected to the addressed outlet 17.

Figure 3B:
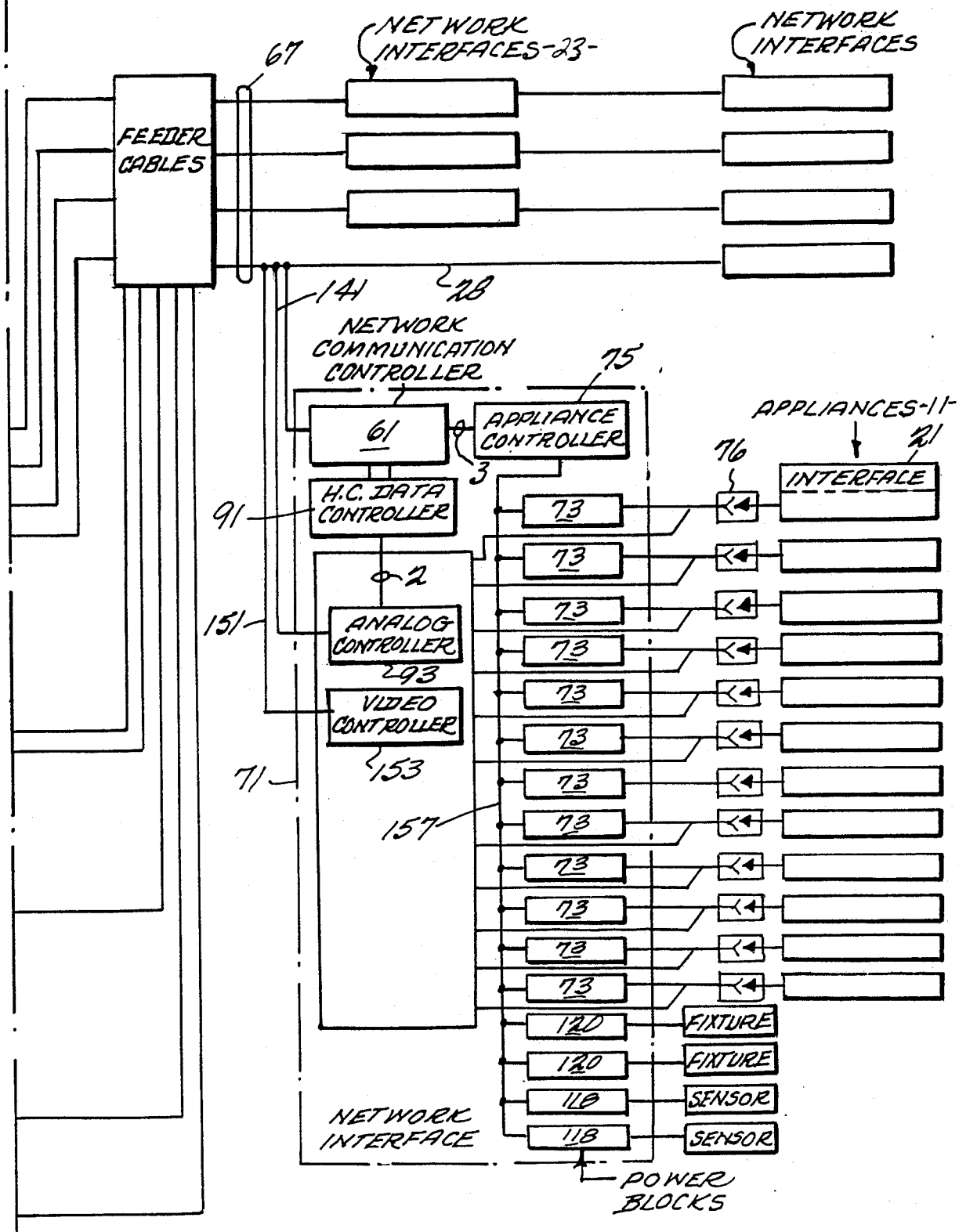

The appliance coordination data network is shown in FIGS. 3A and 3B, which illustrates a complete wiring scheme for a typical house according to the preferred embodiment of the present invention. As shown in these figures, the appliance data distribution system is used in conjunction with an electrical energy distribution system, which will be hereinafter described. Power from an external source is supplied through a standard electric watt hour meter 43 to a transfer switch 45. Also connected to the transfer switch 45 is an auxiliary power generator 47 which generates power in case of an emergency outage. The auxiliary power generator 47 can be of conventional design known in the art. Assume for the present description that power from the external source is being coupled into the system through the transfer switch 45. The power is coupled to a load center 49 and is conveyed to each of a plurality of circuit breakers 51 as illustrated. The circuit breakers can be of various amperage ratings as desired. A series of dedicated appliances 52 are connected to selected circuit breakers for receiving input power. These circuit breakers are in turn controlled by a network interface unit 53 at the service center. The network interface unit 53 includes a plurality of breaker power blocks 55 which are connected to the circuit breakers 51. The outputs of the respective breaker power blocks 55 are controlled by an appliance controller 57, which in turn is controlled by the input received from a network communication controller 59. Data communication lines communicate data between the dedicated appliances 52 and the respective breaker power blocks 55. The information conveyed by the dedicated appliance to the breaker power block 55 is then either utilized by the appliance controller 57 to control the power to other appliances or is applied to the network communication controller 59 for conveyance to network communications controllers 61 located in specific rooms within the house. In turn, information received by the network communication controller 59 is utilized to control power flow to the dedicated appliances 52 by appropriately controlling the corresponding circuit breaker 51.

A power center 64 is provided having a 12 volt supply with a battery, and in one embodiment of the invention, also a 48 volt DC supply. These supplies convert AC power into DC power for utilization by appropriate appliances within the house. In the case of the 12 volt supply 63, a rechargable battery system is provided for temporary power in case of emergency. Electrical energy in the form of 120 volts AC, 12 volts DC and 48 volts DC is provided on at least four feeder cables 67 to network interface units 23 located in various rooms or groups of rooms within a house. Each room network interface 23 is illustrated in enlarged form by the block 71 and has a plurality of power blocks. Each outlet control type power block 73 is connected to a simplex outlet. The outlet is capable of being connected to an associated appliance as illustrated. As aforementioned, each appliance has an appliance interface for generating data signals indicating the power desired. It is only when the appliance interface generates the appropriate signal that power is coupled to the outlet connected to the associated appliance. Fixture type and switch/sensor type power blocks 120, 118, respectively are also connected to fixtures and switches or sensors as illustrated. Power flow through the power blocks is controlled by an appliance controller 75 which in turn is controlled by a network communication controller 61. Thus, the appliances, fixtures and switches or sensors connected to the respective power blocks can provide signals for controlling energy flow to an associated appliance in the room or in some other room within the house. Control of power blocks within other rooms of the house is conveyed by the communication controller 61.

Each of the outlet control type power blocks 73 and fixture type 73 is capable of performing electrical switching and monitoring for electric and gas power to appliances and or devices. Each of the power blocks is capable of bidirectional communication through two ports. The first port links the communications between the power block and the appliance, and the second port links the power blocks either to other power blocks or to different network interface units.

The number of power blocks in any given network interface unit 23 in a particular room or group of rooms depends upon the overall size of the room and the number of appliances which are expected to be operated therein. The network interface unit 23 shown as block 71 contains 16 power block devices. Each power block unit is energized by the 12 volt DC supply from the electrical energy distribution system. In the illustrated embodiment a transfer power block 56 is provided to monitor an electric watt hour meter 43 and is capable of reporting the cumulative power usage that is provided therethrough. Transfer power block 56 will control transfer switch 45, which is connected to an auxiliary power generator 47 in case of an emergency outage, in which case it receives a power usage signal from said watt-hour meter indicating power is out. A further function of the dedicated appliance breaker power blocks 55 is to control the state of the circuit breakers 51 which are connected to the 120/240 VAC dedicated appliances 52. These breaker power blocks 55 will communicate with the appliances 52 via control signal and status signal lines and transfer any information to other appliances or devices via one of the digital data communication networks provided in the present invention.

Figure 4:
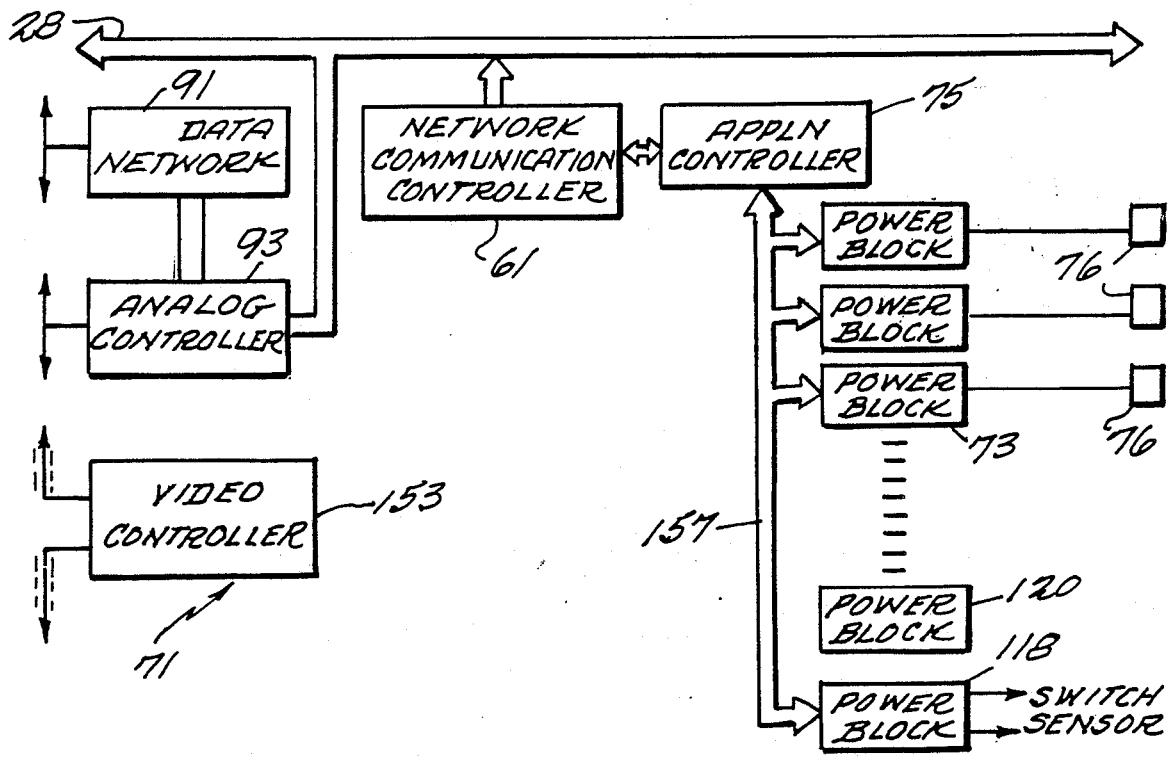
FIG. 4 is a more detailed schematic representation of the network interface illustrated in FIG. 2.

As mentioned previously, all power blocks located within one network interface unit are connected together by a common communication signal bus 157. As shown schematically in FIG. 4, the communication signal bus system 157 is connected to an appliance controller unit 75, which coordinates all of the communications between the power blocks 73 and any communications to power blocks in other network interface units. In order for communications signals to be sent from one network interface 71 to another, a network communications controller 61 is provided. The network communications controller 61 positioned within each network interface is connected to the appliance controller 75 and to the appliance data communications cable 28, which is routed to all network interface units throughout the house.

The data distribution cable 35 is preferably composed of three shielded twisted pairs of number 26 AWG solid copper wire. Only one wire pair is used for the appliance coordination data communications local area network. The other two wire pairs are used by the high capacity data network, which will be later described. The single wire pair from the data distribution cable 35 which is used for the appliance coordination data communication network is connected to the output of the network communication controller device 61 in the room network interface unit 71 and is routed to the network patch panel 81 located in wire closet 83. The network patch panel device 81 is similar to a conventional telephone device used to distribute or interconnect telephone lines in a building. This unit provides for the necessary interconnections to form the two data communication local area networks, namely, the appliance coordination data network and the high capacity data network.

The data distribution cable 35 is routed along with the power feeder cable 67 to each of the room network interface units 71. A single wire pair in the cable is then routed to the input of the network communications controller unit 61 located within the room network interface unit 71. The network communications controller unit 61 provides for data communications from one network interface to another within the house. The appliance controller 75 provides the coordination of data communications to the power blocks within one network interface unit and any communications to another network interfaces via the network communications controller unit 61.

2. The High Capacity Data Network System

The high capacity data network system is intended to transfer high speed digital data, primarily between controllers, including the specialized controllers and the regional controller discussed above. Data may also be exchanged between the house and a data base outside, such as a town library or a commercial service. In the preferred embodiment, the high capacity data network is structured as a local area network that is designed to transmit high volumes of data at a rate that is preferably 1 million bits per second or higher.

Figure 5:
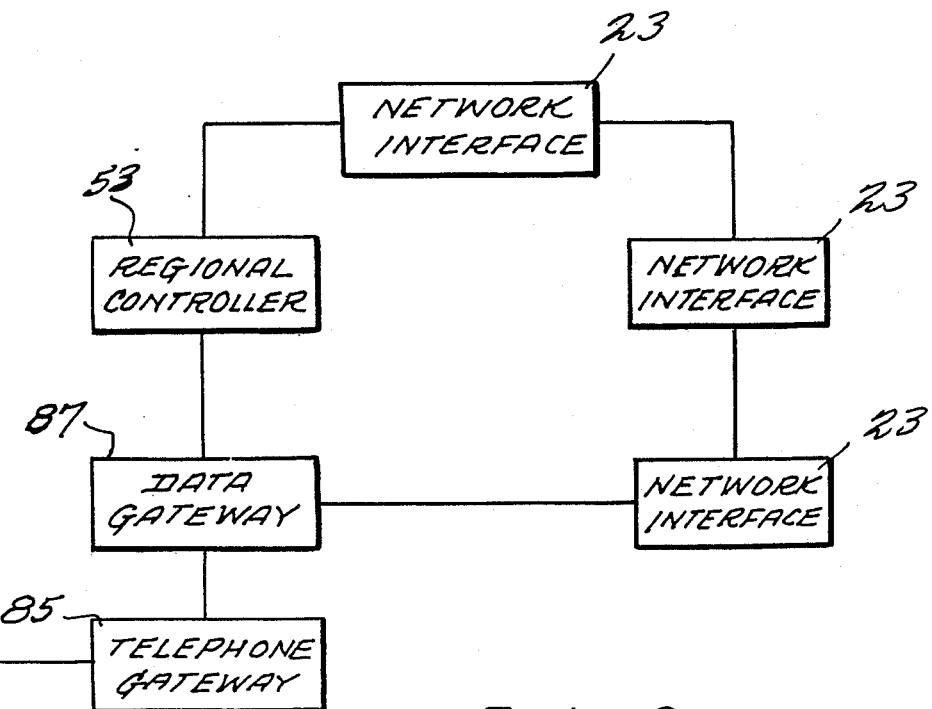
FIG. 5 is a schematic representation of a ring topology arrangement for a local area network.

As illustrated in FIG. 5, the local area network of the high capacity data network is preferably arranged as a token ring. In this arrangement, data packets are relayed from the regional controller from one network interface to another. The data may originate in the regional controller, or in an appliance connected to a network interface, or in a telephone gateway 85 connected to a data network gateway 87.

As shown in FIGS. 3A, and 3B the components required for this system are located in two areas of the house: the wire closet and the individual rooms of the house. The components located in the wire closet 83 consist of a telephone gateway 85, the high capacity data network gateway 87 and the network patch panel 81. As has been previously discussed, appliance data distribution cable 35 includes both the appliance coordination data network and the high capacity data network. As was also described above, there are three pairs of wires in the data distribution cable 35. Two pairs of wires in this cable support the high capacity data network, while the remaining pair is dedicated to the appliance control system.

The high capacity data network gateway 87 is connected to the network patch panel unit 81 by two pairs of wires to deliver data from the telephone gateway 85 to the high capacity data network. This link will be used when high quantities of high speed digital data enter the house via the telephone gateway. The data distribution cable 35 is routed to the network interface unit 71 provided in each room or group of rooms in the house. The two pairs of wires for the high capacity data network system are connected to the inputs of the high capacity data controller 91 located within the network interface unit.

The outputs of the high capacity data controller 91 are connected to the analog services controller unit 93 located within the network interface unit. As will be discussed hereinbelow in regard to the analog services distribution system, there is a matrix switch unit provided for each convenience outlet within the analog services controller unit 93. The four unused input lines of the switch units are connected to the outputs of the high capacity data network control unit 91.

The four output lines of each of the matrix switch units are routed to the simplex outlet 76 via an analog services portion of the outlet cable. The analog services controller 93 can connect these four lines either to the analog services distribution bus 141 or to the high capacity data network controller 91. The analog services controller 93 is operated via commands contained in the control message produced by the appliance 11. The control message is sent by the appliance to the associated power block. There the commands to access the high capacity data network are extracted and routed to the analog services controller.

Thus, the high capacity data network gateway 87 provides an electronic interface between the telephone gateway and the two data communications local area networks in the house. When digital data is available from telephone lines, gateway 85 will provide the linkage from the telephone network to the two data networks of the house. Low speed data and control data will be routed to the appliance coordination data network, while high speed data will be routed to the high capacity data network. The high capacity data controller 91 receives data directly from an appliance and prepares the data to be transmitted on the high capacity data local area network. Data controller 91 also receives data from the high capacity data local area network and extracts the data for transfer to the individual appliance.

The two local area networks of the present invention permit data communications among any of the appliances and controllers that are connected to and capable of using the networks. However, when applying the present invention within buildings that contain multiple units, such as condominium units, the concept of unlimited access among appliances and controllers needs to be modified somewhat. For this purpose, the concept of a "region" is introduced. The two local area networks for data communications in the present invention constitute a single "region". Thus, each unit in a multi-unit building will constitute a separate "region". A limited degree of connection among regions is desirable in such an environment to accommodate necessary data exchanges among units. For example, data from individual apartment sensors might need to be routed to a common heating or cooling plant. Such a multiple region configuration of the present invention is illustrated in FIG. 6.

Figure 6:
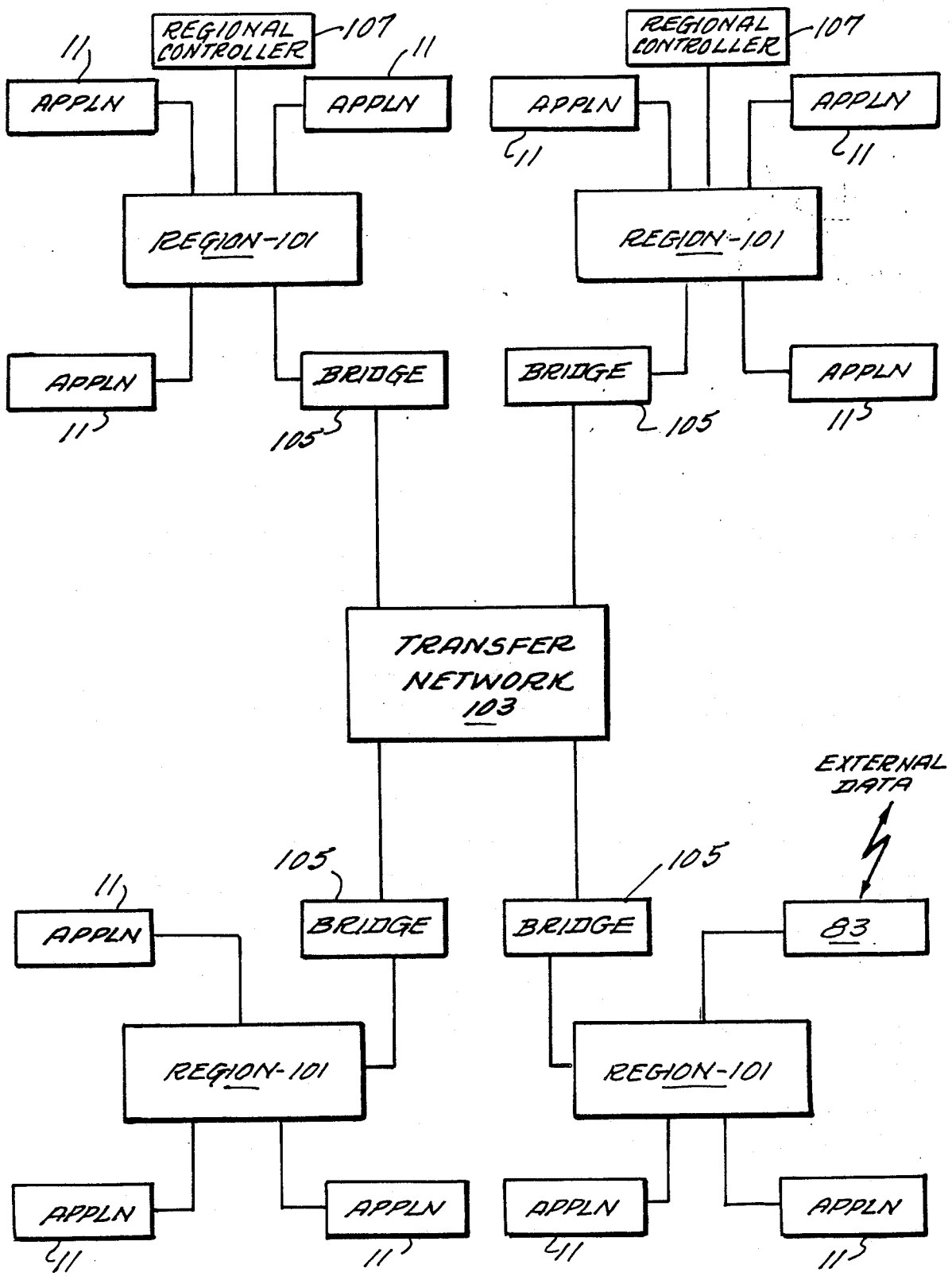
FIG. 6 is a schematic representation of a system constructed according to the preferred embodiment of the present invention in its multiple region configuration.

As shown in FIG. 6, a number of regions 101 are connected through a transfer network 103 via bridges 105. These interconnection mechanisms are transparent to appliances, sensors and controllers. Data can be routed between any appliance or in any region. However, the bridges 105 may be programmed to act as sentries to limit access to a region for security and privacy. Each region 101 may contain specialized controllers and a regional controller 107. Each of the regional controllers 107 shown in FIG. 6 corresponds to the house controller previously discussed. A regional controller 107 will provide services applicable to an entire region, such as monitoring appliance activity and maintaining a map of appliance location according to outlet address.

3. The Energy Distribution System

Enhanced safety in energy distribution is a key requirement of the present invention. A major change from prior art energy distribution systems is proposed in the distribution of electricity and gas to reduce significantly the possibility of accidental contact with dangerous energy levels. Accordingly, high levels of energy will be supplied in a house according to the present invention only when requested by properly operating appliances.

Another energy related innovation of the present invention is the availability of energy in new forms. These types of energy have in fact been used by prior art appliances but a conversion of energy was required inside the appliance from traditional 120 VAC Because of the availability of different types of electrical energy in a house constructed according to the present invention, potential cost savings will be available to appliance manufacturers and homeowners.

The present invention further includes a closed loop energy distribution system by which energy is delivered only to valid appliances from an outlet. According to the present invention, all electricity and gas outlets in a house are unenergized until an appliance is connected and requests energy using a standard protocol defined for that appliance.

The present invention further provides for controlled energy flow to a particular appliance. When an appliance requests energy, it specifies a minimum and maximum rate of flow for electric current or of gas. The flow rate rarely will be allowed to reach the maximum available from conventional outlets because most appliances in a house never consume energy at this maximum rate. In addition, as energy is delivered to an appliance, the flow thereof is monitored by the present invention. Each outlet is supervised individually from control points located throughout the house. The energy flow is cut-off if the rate is outside the range needed by the appliance. Also, the voltages among the electric power conductors are monitored to ensure nominal operation. Ground fault circuit interruption is included in all circuits. Energy flow monitoring can be augmented by the appliance. Provision has also been made for the appliance to signal to the control unit to stop energy flow immediately if the appliance senses an emergency, such as a thermal overload.

The use of 240 VAC power is limited to selected fixed location appliances connected to dedicated circuits. The 48 VDC power may be provided to take advantage of the growing use of DC motors and appliances. This form of power allows for greater versatility in speed control, and for lower noise. Most types of electronic devices work on DC voltage, and DC power at this voltage is safer than conventional 120 VAC power. The 12 VDC power supply is used primarily to power the control electronics of the present invention. Available current is limited near the point of consumption, and the power delivered from an uninterruptible power source, is designed to continue operation after a power failure. Because of the current limitation and the low voltage, this source offers higher safety and has lower fire risks than conventional 120 VAC power. The 12 VDC supply is backed up by batteries to form an uninterruptable power source, which may be termed the "UPS supply". These batteries will be continually recharged from the AC main supply or from photovoltaic cells. A maximum of 20 watts is to be drawn from the 12 VDC supply when operated in backup mode. The standby power from the UPS is used to maintain memory in the electronic components of the present invention during a power failure. Also, this power is used to assure an orderly shutdown and restart of the systems of the present invention, especially the closed loop energy control, since those systems involve human safety.

An innovative gas distribution system is also included in the present invention. The goal is to make gas available throughout a house, using a branch distribution scheme similar to that used for electricity. This piping will be routed to locations appropriate for cooking, room heating, space heating and cooling and stationary gas appliances. Gas outlets will be provided in the walls of the house. Gas is supplied to these outlets only when requested by a gas appliance. The appliance requests gas via an electronic signal sent to an electrically actuated gas flow control unit located near the outlet.

FIG. 3 also illustrates the energy distribution system of the present invention. The energy distribution system elements in FIG. 3 are located in two areas of the house: the service center and in the individual rooms of the house.

The electrical service entrance connections from the utility company are attached conventionally to an electric watt hour meter 43. The electric service (240 VAC, 60 Hz, single phase) is routed through the electric meter 43 and connected to an input of the transfer switch 45. The output of the transfer switch is connected to the input of the load center equipment 49. However, the optional transfer switch 45 may be omitted, with the service from the meter 43 being routed directly to the input of the load center equipment 49. The electric watt hour meter 43 contains a communications output connection as above-described which passes a control message to the appliance coordination data network accessed via a network interface 53 to monitor power usage in the house. A second input of the transfer switch 45 is connected to the output of an auxiliary power generator 47 for a secondary source of 120/240 VAC if required. The transfer switch 45 is normally a manually operated device, but contains a connection for external control which allows automatic operation when used with the appliance coordination data network.

The load center power components consist of the circuit breakers 51, the power center 64 and the power feeder cables 67. The load center panel 49 contains the required circuit breakers for limiting the loads to the various dedicated appliances, power feeder cables, and power supplies. The power center 64 contains two DC power supplies 63 and 65 and the power feeder cables 67 contain the interconnection wires needed to provide electrical power distribution throughout the house.

In the load center 49, the electric service from the output of the transfer switch 45 is connected to the input of the load center, which is typically a 200 ampere main circuit breaker 48. This breaker is used as the main disconnect switch to remove all power from the system. Breaker 48 will be operated manually. The remaining breakers in the load center are divided into four categories: breakers 95 for the 240 VAC dedicated appliances, breakers 97 for the 120 VAC dedicated appliances, breakers 99 for the 120 VAC power feeder cables and breakers 100 for the DC power supplies.

The 240 VAC dedicated appliance section contains four 240 VAC circuit breakers 95 which are operated by a remote control input. The remote control input will be utilized to operate these special circuit breakers by controlling the open/closed state and the resulting availability of power to the attached appliances. These breakers will supply electric power to fixed location appliances that operate on 240 VAC at high currents, such as the clothes dryer and range.

The 120 VAC dedicated appliance section contains four 120 VAC circuit breakers with remote control inputs. The remote control input will be utilized to operate these special circuit breakers by controlling the open/closed state and the resulting availability of power to the attached appliances. These breakers will supply electric power to fixed location appliances that operate on 120 VAC at high currents, such as the furnace, dishwasher, and refrigerator.

The 120 VAC power feeder section contains four 120 VAC circuit breakers with remote signal outputs. The output signals will be used to report the status of the breaker via the appliance coordination data network. These breakers supply 120 VAC electric power to the network interface units in each room of a house constructed according to the present invention.

The load center contains two 120 VAC circuit breakers for the DC power center: a 20 AMP circuit breaker for the 12 VDC "UPS" supply and one 30 AMP circuit breaker for the 48 VDC "utility" supply. These breakers both generate remote signal outputs to be used to report status via the appliance coordination data network.

The 12 VDC supply 63 contains a battery which will maintain DC power during a loss of main AC power, hence the name "uninterruptable power source". The output of the supply is routed along with the outputs of the power feeder circuit breakers to the power feeder cable 67.

The output of the 48 volt DC supply 65 is routed to the input of the DC transfer switch 66. The other input of the DC transfer switch is connected to the output of an auxiliary power generator 68 for an optional secondary source of 48 VDC. The output of the DC transfer switch is combined with the output of each power feeder circuit breaker 99 and the 12 VDC supply 63. This combination of 120 VAC, 48 VDC, and 12 VDC "UPS" electrical power is conveyed through the power feeder cable 67 to be routed to the network interface unit 71 in each room or group of rooms in the house.

The electrical power for each room in the house is routed via the power feeder cable 67 from the load center 49 and is connected to the input of each network interface unit 71. The electrical distribution system for an average size house will consist of four power feeder cables, each capable of supporting two network interface units. Each network interface 71 routes the power (AC and DC) internally to outlet control type power blocks 73 and fixture type power blocks 120. The outlet control type power blocks 73 and fixture type power blocks 120 then deliver the appropriate power (120 VAC or 48 VDC) to each outlet 76 via an outlet cable.

The outlet control type power blocks 73 will receive an analog and a digital communication signal from an appliance interface 21 contained within each appliance. Electric power will be provided to an appliance only when the proper power desired signals have been received by the outlet control type power block 73. A maximum of twelve such outlet control type power blocks 73 can be accommodated within a network interface unit. The switch/sensor type power block 118 is the only one of the power blocks which does not require connection to either 120 VAC or 48 VDC; only 12 VDC power is required since this type of power typical for the operation of switches and sensors. Switch/sensor type power block 118 receives analog and digital communication signals from a device such as a switch, sensor or control panel, but does not control any output power. A network interface can accommodate two of the switch/sensor type power blocks 118.

The fixture control type power block 120 will not receive a communication signal from a fixture device. Instead, the power to the fixture may be controlled by a digital signal from a switch/sensor type power block 118 for remote control of the fixture by a switch or sensor. The signal is communicated within the network interface over a common bus to which all power blocks are connected, as is discussed hereinbelow. A maximum of two such fixture power blocks 120 can be accommodated within a network interface unit.

Each of the three types of power blocks in a network interface 23 has a digital connection point which allows bi-directional communications with each other over a common communication bus 157. This communication bus 157 is internal to the network interface and is managed by the appliance controller 75. When operated in conjunction with the appliance coordination data network, routing of the signals and messages to other network interface units will be made possible.

The electrical power and communication signals (analog and digital) from each outlet control type power block 73 are routed from the network interface unit to each simplex receptacle 76 via an outlet cable. In the preferred embodiment, an outlet cable consists of thirteen wires, including three wires for power (VAC or VDC) and ground, five wires for communications, and five wires for analog services. The electric power from each installed fixture type power block 120 is routed from the network interface unit to each installed fixture via a fixture cable. This cable in the preferred embodiment consists of two conductors for power plus a ground wire. The communication signals (analog and digital) from each switch/sensor type power block 118 are routed from the network interface unit to each switch or sensor location via a switch/sensor cable. This cable preferably consists of five wires for communications and 12 VDC power.

4. The Analog Services Distribution System

The analog distribution system provides services that are delivered via analog signals which are available at outlets throughout the house. This system is intended to accommodate existing appliances with no changes. Thus, a conventional telephone will be able to be plugged into an outlet through a passive adapter that accepts a conventional telephone plug on one side and has a plug compatible with the present invention on the other side.

Examples of the type of analog services that will be available in a house constructed according to the present invention are telephone service, voice intercom service, intercom signaling such as a door bell or a door buzzer and a stereo system that can provide background music. According to the preferred embodiment of the present invention, a maximum of two of the above listed analog services will be available at any one outlet.

FIG. 3 illustrates the analog services distribution system within the complete wiring scheme for a typical house constructed according to the present invention. The analog services distribution is used in conjunction with two previously mentioned systems (the energy distribution system and the appliance coordination data network), which are routed to the network interface units 71 located in a room or group of rooms of the house.

The analog services distribution system components located in the wire closet 83 of the service center consists of the telephone gateway 85, the data network gateway 87, a music headend 137, an intercom headend 139, and a distribution cable 141. Two pairs of wires from the telephone service entrance are connected to the telephone gateway 85, which is located in the wire closet 83. More than two pairs of wires may be connected if more than two telephone numbers are needed within the house. In addition to the telephone gateway equipment 85, the music headend equipment 137 and the intercom headend equipment 139 are provided in order to transmit music or voice messages throughout the house. The music headend equipment 137 provides any amplifiers or other equipment necessary to transmit the music throughout the house. The intercom headend likewise provides for any amplifiers that are necessary to transmit the intercom signals throughout the house. The present invention further provides for a common mounting equipment.

The output of the telephone gateway 85 is routed to two locations within the wire closet 83, the data network gateway 87, and the analog service patch panel 135. The data network gateway device will allow telephone access to the two data communications networks within the house. The telephone gateway output which is routed to the patch panel is combined with the outputs of the music and intercom headend equipment outputs to form the analog services feeder cables 141 in the analog services patch panel. The feeder cables 141 are then combined with the previously mentioned distributions systems cables and are routed to all room network interface units as is above-described. Of course, the different signals may be multiplexed and combined within a smaller number of wires as is known in the art.

The consolidated feeder cable including the cables 141 is routed to each network interface unit that is located within the various rooms in the house. The analog service cable is then connected to the input of the analog services controller unit 93. The analog services controller 93 distributes the signals to the individual outlets via the analog services portion 141 of the outlet cable.

The analog services controller unit 93 preferably consists of a number of matrix switch devices, which are connected in parallel to the eight paired input wires. The unused input lines of the matrix switch unit are used by the high capacity data network, as is above-described. The four output lines of each of the matrix switch devices are routed to each simplex outlet via the analog services portion 141 of the outlet cable. The analog services controller unit is also connected to the common communication bus system, as are the power blocks located within the network interface unit. An appliance may inform the analog services controller unit via the appropriate power block which service lines it is requesting for service connections.

Thus, the telephone service entrance provides an interface between the telephone utility wires and the internal wires of the house. This unit is typically mounted in a convenient location inside or outside the house and preferably contains lightening arresters and/or ground connections. The telephone gateway 85 is located in the wire closet of the service center and provides a link to public communication systems for access voice and data for use within the house. This unit is designed to accommodate existing data transmission technology and will interface to digital telephone systems in the future.

5. The Video Services Distribution System

The video services distribution system accommodates television signal received from an antenna, from CATV and from a satellite. In addition, services are provided to distribute video signals which are originated from within the house, such as from a VCR. The video distribution system is a two-way system. Any outlet equipped for video can receive all channels of video, or a source such as a video cassette recorder can insert a signal for distribution to other video outlets. Data within the energy control message selects the direction of the video signal at an outlet.

FIG. 3 illustrates the video services distribution system within the context of a complete wiring scheme for a typical house. The video services distribution system operates in conjunction with the energy distribution system, the appliance coordination data network, and the analog services distribution system. These services are routed from the service center via four feeder cables 67 to the network interface units 23 in each room of the house. The service entrance equipment for the video services distribution system consists of the individual wires or cables that are connected to the external video services that are supplied to the house. These external services include an antenna mounted in or near the house, a cable TV input and/or input from an external satellite reception dish. All of the television service entrance cables and wires are routed to the input of the video headend equipment 149 located in or near the wire closet in the service center. The equipment consists of video splitters, combiners, and amplifiers necessary to distribute all of the signals throughout the house. All of the service entrance input signals are routed to the input of a six-way combiner unit that is located within the video headend equipment 149. The output of the combiner unit is then routed through an amplifier and then to a four-way splitter unit within the headend equipment 149 which constitutes one-half of the video distribution cables 151 that transmit these signals throughout the house.

The video signals from internal sources such as VCRs, cameras, and other video sources located within the house are routed via a cable that is separate from the one carrying the signals to outlets. These two cables, one of which is dedicated for transmission and the other for reception, comprise the video distribution cable 151 which is routed along with the other feeder cables mentioned above to all rooms in the house. The internal video signal cables form the feeder cables which are routed to a four-way combiner unit within the headend equipment. The output of this unit is then routed through an amplifier and then to one of the inputs of the service entrance combiner unit.

The video distribution cables 151 are routed along with the other distribution cables to each room network interface unit 71. The distribution cable is then connected to the input of the video services controller unit 153, which distributes the signals to the individual outlets.

The video services controller unit 153 consists of a 12-way splitter unit and a 12-way combiner unit, along with 12 two-way switch units. Each switch is a single pole, triple throw device with a center off position.

The transmit portion of the video distribution cable from the feeder is routed to the input of the 12-way splitter unit. The reception portion of the video distribution cable from the feeder is routed to the output of the 12-way combiner unit. One output from the splitter unit and one input from the combiner unit is routed to one of the two-way switch units. Each switch unit allows for the selection of an output signal or an input signal. The output of each switch unit is then routed to each simplex outlet via a single coax cable which is separate from the simplex outlet cable. The switches in the video control unit 153 are operated by commands contained in the control message sent by the appliance to the supervising power block. The power block interprets the control message and routes the video commands to the video controller. The services are operated accordingly so that the video system can perform as desired.

While the invention has been described in connection with what is presently considered to be the most practical and preferred embodiment, it is to be understood that the invention is not limited to the disclosed embodiment, but rather is intended to cover various modifications and equivalent arrangements included within the spirit and scope of the appended claims.

What is claimed is:

1. An automated system apparatus for providing energy from an energy source and communication services within a house to appliances capable of receiving and generating appliance digital data, comprising:

appliance coordination data network means for communicating appliance digital data within the house;

higher capacity data network means for transferring higher capacity digital data at a rate faster than said appliance digital data within the house;

energy distribution means for supplying said energy from said source to appliances throughout the house responsive to said appliance digital data received from said appliances;

analog services distribution means for distributing conventional analog signals throughout the house;

video services distributing means for distributing conventional video signals throughout the house; and a plurality of common outlet means disposed throughout the house for connectable attachment of said appliances, each common outlet means connected to and capable of transferring signals from said appliance digital data network means, said higher capacity data network means, said energy distribution means, said analog services distributing means and said video services distributing means.

2. Apparatus according to claim 1, wherein said appliance coordination data network means comprises a plurality of power block means for applying said energy to said appliances.

3. Apparatus according to claim 2, wherein at least one of said plurality of power block means is a breaker power block means for controlling the status of a circuit breaker interposed between said energy source and said common outlet means.

4. Apparatus according to claim 2, wherein at least one of said plurality of power block means is a transfer power block means for monitoring the state of said energy received by said energy source and for activating a transfer switch in said energy distribution means to provide said energy to said energy distribution means from an alternate power source.

5. Apparatus according to claim 2, wherein
  a common communication bus means for transmitting appliance digital data between said plurality of said power block means, and
  said appliance coordination data network means further comprises appliance controller means for coordinating appliance digital data plurality of power block means.

6. Apparatus according to claim 1, wherein said analog services distributing means includes telephone gateway means for communicating between said higher capacity data network and a standard telephone line.

7. Apparatus according to claim 6, wherein said higher capacity data network means further comprises network gateway means for receiving said higher capacity digital data from said telephone gateway means and higher capacity data controller means for receiving said higher capacity digital data from said network gateway means, and wherein said analog services distributing means includes an analog services controller having a matrix switch unit means for establishing an electrical connection between one of said analog services distributing means and an output of said higher capacity data controller means.

8. Apparatus according to claim 1, wherein said energy distribution means comprises means for distributing at least one type of AC current within the house, and means for distributing at least one type of DC current within the house.

9. Apparatus according to claim 8, wherein said means for distributing DC current comprises means for delivering a 12 VDC current and means for delivering a 48 VDC current.

10. Apparatus according to claim 8, wherein said means for distributing DC current includes a DC power supply having a battery which will maintain DC power during a loss of external power.

11. Apparatus according to claim 1, wherein said analog services distributing means comprises a music headend for generating music, an intercom headead and means for connecting said headends to each of said plurality of common outlet means.

12. Apparatus according to claim 1, wherein said video services distributing means comprises gateway means for receiving video signals from one or more external sources; headend combiner means for combining the signals from the sources into a video output signal; means for amplifying said video output signal and splitter means for dividing the amplified video output signal and sending the divided video output signals to each of said plurality of outlet means.

13. Apparatus according to claim 2, wherein at least one of said plurality of power block means is an outlet control power block means for applying power to one of said appliances through said one of said common outlet means only after attachment of said one appliance to said one common outlet means and after said outlet control power block means receives a power desired appliance digital data signal from said one attached appliance.

14. Apparatus according to claim 2, wherein at least one of said plurality of power block means is a fixture power block means for applying power to one of said appliances only after said fixture power block means receives a power desired digital data signal.

15. Apparatus according to claim 14 further comprising:
  switch means for producing said power desired digital data signal; and
  switch/sensor power block means for transmitting said power desired digital data signal produced by said switching means to said fixture power block means.

16. Apparatus according to claim 2 further comprising:
  switch means for producing a power desired digital data signal; and
  switch/sensor power block means for transmitting said power desired digital data signal produced by said switching means to one of said plurality of power block means.

17. Apparatus according to claim 1 further including an outlet cable having a plurality of individual wires and a coaxial cable attached to said common outlet means, each of said plurality of individual wires for carrying signals from only one of said appliance digital data network means, said higher capacity data network means, and said energy distribution means and said coaxial cable for carrying signals from said analog services distributing means and said video services distributing means.

* * * * *